(12) United States Patent
Eisen

(10) Patent No.: US 9,196,004 B2
(45) Date of Patent: *Nov. 24, 2015

(54) SYSTEMS AND METHODS FOR DETECTION OF SESSION TAMPERING AND FRAUD PREVENTION

(71) Applicant: THE 41ST PARAMETER, INC., Scottsdale, AZ (US)

(72) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,818

(22) Filed: Aug. 29, 2014

(65) Prior Publication Data

US 2015/0221019 A1 Aug. 6, 2015

Related U.S. Application Data

(63) Continuation of application No. 13/414,678, filed on Mar. 7, 2012, now Pat. No. 8,826,393, which is a continuation of application No. 11/694,882, filed on Mar. 30, 2007, now Pat. No. 8,151,327.

(60) Provisional application No. 60/744,107, filed on Mar. 31, 2006.

(51) Int. Cl.
*H04L 29/06* (2006.01)
*G06F 21/00* (2013.01)
(Continued)

(52) U.S. Cl.
CPC ........ *G06Q 30/0635* (2013.01); *G06Q 20/4016* (2013.01); *H04L 63/1466* (2013.01); *H04L 67/02* (2013.01)

(58) Field of Classification Search
CPC ................. H04L 63/1466; H04L 63/0876
See application file for complete search history.

(56) References Cited

U.S. PATENT DOCUMENTS

| 5,748,740 A | 5/1998 | Curry et al. | |
|---|---|---|---|
| 5,764,275 A | * 6/1998 | Lappington et al. | .......... 725/136 |

(Continued)

FOREIGN PATENT DOCUMENTS

| EP | 0418144 A1 | 3/1991 |
|---|---|---|
| EP | 0923039 A1 | 6/1999 |

(Continued)

OTHER PUBLICATIONS

Notice of allowance dated Dec. 26, 2014 for U.S. Appl. No. 11/862,165.

(Continued)

*Primary Examiner* — Lisa Lewis
(74) *Attorney, Agent, or Firm* — Wilson Sonsini Goodrich & Rosati

(57) ABSTRACT

The invention provides methods and apparatus for detecting when an online session is compromised. A plurality of device fingerprints may be collected from a user computer that is associated with a designated Session ID. A server may include pages that are delivered to a user for viewing in a browser at which time device fingerprints and Session ID information are collected. By collecting device fingerprints and session information at several locations among the pages delivered by the server throughout an online session, and not only one time or at log-in, a comparison between the fingerprints in association with a Session ID can identify the likelihood of session tampering and man-in-the middle attacks.

20 Claims, 3 Drawing Sheets

(51) Int. Cl.
*G06Q 30/06* (2012.01)
*H04L 29/08* (2006.01)
*G06Q 20/40* (2012.01)

(56) References Cited

U.S. PATENT DOCUMENTS

| | | | |
|---|---|---|---|
| 5,892,900 A * | 4/1999 | Ginter et al. | 726/26 |
| 6,092,053 A | 7/2000 | Boesch et al. | |
| 6,105,012 A | 8/2000 | Chang et al. | |
| 6,112,240 A | 8/2000 | Pogue et al. | |
| 6,148,407 A | 11/2000 | Aucsmith | |
| 6,163,771 A | 12/2000 | Walker et al. | |
| 6,205,436 B1 | 3/2001 | Rosen | |
| 6,678,666 B1 | 1/2004 | Boulware | |
| 6,718,363 B1 * | 4/2004 | Ponte | 709/203 |
| 6,892,307 B1 | 5/2005 | Wood et al. | |
| 6,895,507 B1 | 5/2005 | Teppler | |
| 6,898,709 B1 * | 5/2005 | Teppler | 713/178 |
| 6,908,030 B2 * | 6/2005 | Rajasekaran et al. | 235/379 |
| 6,957,339 B2 | 10/2005 | Shinzaki | |
| 7,089,585 B1 | 8/2006 | Dharmarajan | |
| 7,100,049 B2 | 8/2006 | Gasparini et al. | |
| 7,165,051 B2 * | 1/2007 | Ronning et al. | 705/64 |
| 7,191,467 B1 | 3/2007 | Dujari et al. | |
| 7,260,837 B2 | 8/2007 | Abraham et al. | |
| 7,272,728 B2 | 9/2007 | Pierson et al. | |
| 7,330,871 B2 * | 2/2008 | Barber | 709/201 |
| 7,349,955 B1 | 3/2008 | Korb et al. | |
| 7,438,226 B2 | 10/2008 | Helsper et al. | |
| 7,577,620 B1 * | 8/2009 | Donner | 705/67 |
| 7,853,533 B2 | 12/2010 | Eisen | |
| 8,151,327 B2 | 4/2012 | Eisen | |
| 8,826,393 B2 | 9/2014 | Eisen | |
| 8,862,514 B2 | 10/2014 | Eisen | |
| 9,060,012 B2 | 6/2015 | Eisen | |
| 9,112,850 B1 | 8/2015 | Eisen | |
| 2001/0016876 A1 | 8/2001 | Kurth et al. | |
| 2002/0035622 A1 * | 3/2002 | Barber | 709/220 |
| 2002/0056042 A1 | 5/2002 | Van Der Kaay et al. | |
| 2002/0073046 A1 | 6/2002 | David | |
| 2002/0073327 A1 | 6/2002 | Vellandi | |
| 2002/0112171 A1 | 8/2002 | Ginter et al. | |
| 2002/0153424 A1 | 10/2002 | Li | |
| 2002/0156836 A1 | 10/2002 | Janosik et al. | |
| 2002/0167965 A1 | 11/2002 | Beasley et al. | |
| 2003/0033356 A1 | 2/2003 | Tran et al. | |
| 2003/0070080 A1 | 4/2003 | Rosen | |
| 2003/0076242 A1 | 4/2003 | Burns et al. | |
| 2003/0105854 A1 | 6/2003 | Thorsteinsson et al. | |
| 2003/0115334 A1 * | 6/2003 | Bhat et al. | 709/227 |
| 2003/0172036 A1 | 9/2003 | Feigenbaum | |
| 2003/0182551 A1 | 9/2003 | Frantz et al. | |
| 2003/0208684 A1 | 11/2003 | Camacho et al. | |
| 2003/0233553 A1 | 12/2003 | Parks et al. | |
| 2004/0006553 A1 * | 1/2004 | de Vries et al. | 707/1 |
| 2004/0034794 A1 | 2/2004 | Mayer et al. | |
| 2004/0105431 A1 * | 6/2004 | Monjas-Llorente et al. | 370/352 |
| 2004/0117321 A1 | 6/2004 | Sancho | |
| 2004/0166857 A1 * | 8/2004 | Shim et al. | 455/436 |
| 2004/0181598 A1 | 9/2004 | Paya et al. | |
| 2004/0203750 A1 | 10/2004 | Cowdrey et al. | |
| 2004/0236696 A1 | 11/2004 | Aoki et al. | |
| 2004/0236702 A1 | 11/2004 | Fink et al. | |
| 2004/0254890 A1 | 12/2004 | Sancho et al. | |
| 2005/0022020 A1 * | 1/2005 | Fremberg | 713/201 |
| 2005/0033653 A1 | 2/2005 | Eisenberg et al. | |
| 2005/0033703 A1 | 2/2005 | Holdsworth | |
| 2005/0076230 A1 | 4/2005 | Redenbaugh et al. | |
| 2005/0108177 A1 | 5/2005 | Sancho | |
| 2005/0113092 A1 | 5/2005 | Coppinger et al. | |
| 2005/0131826 A1 | 6/2005 | Cook | |
| 2005/0188423 A1 * | 8/2005 | Motsinger et al. | 726/22 |
| 2005/0278542 A1 | 12/2005 | Pierson et al. | |
| 2006/0010072 A1 | 1/2006 | Eisen | |
| 2006/0048211 A1 | 3/2006 | Pierson et al. | |
| 2006/0130132 A1 | 6/2006 | Dharmarajan | |
| 2006/0155985 A1 * | 7/2006 | Canard et al. | 713/156 |
| 2006/0200855 A1 | 9/2006 | Willis | |
| 2006/0200856 A1 * | 9/2006 | Salowey et al. | 726/5 |
| 2006/0264202 A1 | 11/2006 | Hagmeier et al. | |
| 2006/0281541 A1 | 12/2006 | Nguyen et al. | |
| 2006/0282660 A1 | 12/2006 | Varghese et al. | |
| 2006/0287902 A1 | 12/2006 | Helsper et al. | |
| 2007/0038568 A1 | 2/2007 | Greene et al. | |
| 2007/0043837 A1 | 2/2007 | Kruse et al. | |
| 2007/0073630 A1 | 3/2007 | Greene et al. | |
| 2007/0204044 A1 | 8/2007 | Rice et al. | |
| 2007/0220594 A1 | 9/2007 | Tulsyan | |
| 2007/0234070 A1 | 10/2007 | Horning et al. | |
| 2007/0234409 A1 | 10/2007 | Eisen | |
| 2007/0239606 A1 | 10/2007 | Eisen | |
| 2007/0294401 A1 | 12/2007 | Shkedi | |
| 2008/0010678 A1 | 1/2008 | Burdette et al. | |
| 2008/0104672 A1 | 5/2008 | Lunde | |
| 2008/0104684 A1 | 5/2008 | Lunde | |
| 2008/0133420 A1 | 6/2008 | Barber | |
| 2009/0037213 A1 | 2/2009 | Eisen | |
| 2009/0083184 A1 | 3/2009 | Eisen | |
| 2010/0004965 A1 | 1/2010 | Eisen | |
| 2011/0082768 A1 | 4/2011 | Eisen | |
| 2012/0174223 A1 | 7/2012 | Eisen | |

FOREIGN PATENT DOCUMENTS

| | | |
|---|---|---|
| EP | 1256911 A1 | 11/2002 |
| WO | WO 01/11450 A1 | 2/2001 |
| WO | WO 01/95550 A2 | 12/2001 |
| WO | WO 02/091226 A1 | 11/2002 |
| WO | WO 03/025868 A1 | 3/2003 |
| WO | WO 03/075197 A2 | 9/2003 |
| WO | WO 03/075197 A3 | 12/2003 |
| WO | WO 2004/038997 A1 | 5/2004 |

OTHER PUBLICATIONS

U.S. Appl. No. 12/732,034, filed Mar. 25, 2010, Eisen.
Derfler, et al. How Network Work. Millennium Ed., Que Corporation. Indianapolis. IN. 2000.
European search report and written opinion dated Nov. 15, 2010 for Application No. 08165224.0.
European search report dated Dec. 23, 2011 for Application No. 5818903.6.
Gralla, Preston. How the Internet Works. Millennium Ed., Que Corporation. Indianapolis, IN 1999.
International search report dated Oct. 29, 2007 for PCT Application No. US2005/35532.
International search report dated Jul. 3, 2008 for PCT Application No. US2007/65776.
Kohno, et al. Remote Physical Device Fingerprinting. 2005 IEEE Syposium on Security and Privacy (IEEE S&P 2005); May 8-11, 2005; Oakland, California, U.S.A. 16 pages.
Manavoglu, et al. Probabilistic user behavior models. Data Mining. 2003; 203-210.
Office action dated Jan. 6, 2010 for U.S. Appl. No. 11/241,739.
Office action dated Feb. 24, 2009 for U.S. Appl. No. 11/694,882.
Office action dated Mar. 3, 2008 for U.S. Appl. No. 11/241,739.
Office action dated Mar. 4, 2010 for U.S. Appl. No. 12/248,867.
Office action dated Mar. 9, 2009 for U.S. Appl. No. 11/241,739.
Office action dated Mar. 13, 2014 for U.S. Appl. No. 12/732,034.
Office action dated Mar. 14, 2012 for U.S. Appl. No. 12/892,868.
Office action dated Mar. 26, 2013 for U.S. Appl. No. 12/248,867.
Office action dated Mar. 27, 2013 for U.S. Appl. No. 12/496,572.
Office action dated Mar. 28, 2014 for U.S. Appl. No. 11/862,165.
Office action dated Apr. 16, 2010 for U.S. Appl. No. 11/862,165.
Office action dated Apr. 20, 2012 for U.S. Appl. No. 12/732,034.
Office action dated May 9, 2008 for U.S. Appl. No. 10/791,439.
Office action dated Jun. 1, 2011 for U.S. Appl. No. 11/694,882.
Office action dated Jun. 11, 2008 for U.S. Appl. No. 11/694,882.
Office action dated Jul. 1, 2009 for U.S. Appl. No. 11/241,739.
Office action dated Jul. 7, 2009 for U.S. Appl. No. 11/862,165.
Office action dated Aug. 23, 2010 for U.S. Appl. No. 11/694,882.

(56) References Cited

OTHER PUBLICATIONS

Office action dated Sep. 10, 2013 for U.S. Appl. No. 13/414,678.
Office action dated Sep. 16, 2008 for U.S. Appl. No. 11/241,739.
Office action dated Oct. 2, 2013 for U.S. Appl. No. 12/496,572.
Office action dated Nov. 15, 2012 for U.S. Appl. No. 12/732,034.
Office action dated Nov. 19, 2012 for U.S. Appl. No. 12/892,868.
Office action dated Nov. 22, 2010 for U.S. Appl. No. 12/248,867.
Office action dated Dec. 7, 2007 for U.S. Appl. No. 10/791,439.
Office action dated Dec. 23, 2009 for U.S. Appl. No. 11/694,882.
White, Ron. How Computers Work. Millennium Ed., Que Corporation. Indianapolis, IN. 1999.
Notice of allowance dated Jan. 3, 2012 for U.S. Appl. No. 11/694,882.
Notice of allowance dated Apr. 30, 2014 for U.S. Appl. No. 13/414,678.
Notice of allowance dated Jun. 10, 2014 for U.S. Appl. No. 12/248,867.
Notice of allowance dated Jun. 24, 2010 for U.S. Appl. No. 11/241,739.
Office action dated Sep. 19, 2014 for U.S. Appl. No. 12/732,034.
Notice of allowance dated May 22, 2015 for U.S. Appl. No. 11/862,165.
Notice of allowance dated May 28, 2015 for U.S. Appl. No. 12/732,034.
Notice of allowance dated Jul. 1, 2015 for U.S. Appl. No. 12/732,034.
Office action dated Mar. 19, 2015 for U.S. Appl. No. 12/496,572.
Office action dated Apr. 8, 2015 for U.S. Appl. No. 12/892,868.

* cited by examiner

| SESSION ID | FINGERPRINT | TIME | PAGE |
|---|---|---|---|
| SID$_1$ | FP$_1$ | t$_1$ | P$_1$ |
| | FP$_2$ | t$_2$ | P$_2$ |
| | FP$_3$ | t$_3$ | P$_3$ |
| | ... | ... | ... |
| SID$_2$ | FP$_1$ | t$_1$ | P$_1$ |
| | FP$_2$ | t$_2$ | P$_2$ |
| ... | ... | ... | ... |

Figure 3

SYSTEMS AND METHODS FOR DETECTION OF SESSION TAMPERING AND FRAUD PREVENTION

This application is a continuation application of U.S. Ser. No. 13/414,678, filed on Mar. 7, 2012, which is a continuation of U.S. Ser. No. 11/694,882, filed on Mar. 30, 2007, now U.S. Pat. No. 8,151,327, which claims the benefit of priority to U.S. Provisional Application Ser. No. 60/744,107, filed on Mar. 31, 2006, which applications are incorporated herein by reference in their entirety.

FIELD OF INVENTION

The invention relates to systems and methods for detecting various forms of session tampering and attempted fraud. More particularly, the invention herein relates to systems and methodologies that identify session hijacking and man-in-the-middle attacks during online transactions with financial institutions and e-commerce transactions.

BACKGROUND

Most online transactions involving the transmission of sensitive or confidential information require a high degree of certainty as to the identity of the parties involved. It is well known that members of the public access the Internet for the purpose of conducting financial transactions, online banking and purchasing of merchandise. These commercial systems suffer from a common disadvantage in that they rely on the transmission of sensitive information over unsecured network routes and lines during each transaction. While these systems often rely on encryption, password protection and other security options that are considered relatively safe, there remains significant risk of fraud, identify theft and misappropriation of information.

The Internet can be described generally as a wide area network of computers or devices that can be remotely located worldwide. The computers or devices are linked by a variety of communication links including telephone lines, cable television lines, satellite link-ups, wireless networks and other telecommunication connections. Internet service providers (ISPs) provide their subscribers or end users with a link to the main backbone of the Internet. The computers and devices can connect to the Internet and are assigned IP addresses to uniquely identify them and set them apart. These computer or device IP addresses may be static or change (dynamic) during each Internet session. Each (user) session may involve some level of activity by a computer with an IP address on which a user spends time at a Web site. The number of user sessions on a site is often used in measuring the amount of traffic at a Web site. A site administrator usually determines the time frame of a user session between logging in and out, e.g., 10 minutes, before an online session is terminated or timed-out due to user inactivity. However if the visitor performs some level of activity within selected time period, this can still be considered one or the same user session and any transactions conducted within that time frame would be considered part of a single session. When a user returns to the site to begin a log-in procedure, or after an allotted time period has expired, this would be considered another user session.

According to many marketing surveys, there is a relatively high percentage of companies and users who refrain from purchasing merchandise and conducting e-commerce over the Internet. There remains a persistent fear that credit card, account and other personal information will be intercepted online by a third party computer hacker and used illegally despite ongoing security efforts. This comes at great expense for users who become victims of identity theft and fraud. At the same time, online vendors and financial institutions are subject to additional risks in the course of transactions subject to illegal activity such as session tampering and session hijacking. Considering the numerous types of incidents that threaten security of enterprise systems and networks, attackers remain capable of modifying and manipulating or taking over online sessions to commit fraud and theft.

There is a need for online solutions that detect session manipulation or tampering so that fraud and the misappropriation or misuse of confidential information can be avoided.

SUMMARY OF THE INVENTION

The invention provides methods and systems related to the detection of session tampering and/or hijacking that can be used in an effort to prevent fraud. Various aspects of the invention can be appreciated individually or collectively to provide solutions against session tampering and/or hijacking.

An aspect of the invention provides methods and systems that collect multiple computer or device "fingerprints" during online visits to sites for banks, financial institutions or other companies that conduct transactions over the Internet. During the course of an online session, a Session Identifier (Session ID) can be assigned to facilitate the exchange of data between computers or devices (server/client). When a user accesses or visits an online account or site using a personal computer (PC) or any device connected to the Internet over HTTP protocol, a PC or device fingerprint corresponding to that computer or device and the relevant Session ID may be collected in accordance with this aspect of the invention.

A preferable embodiment of the invention may incorporate one or more steps of collecting computer or device fingerprints and Session IDs at various instances throughout an online session. For example, such information may be collected when a user navigates to a log-in page, a page that concludes a transaction or HTML pages from a Web site that are common for online banking applications such as setting up new payees, changes of address (e-mail or street), and authorizing the wiring or transfer of money. By collecting fingerprints and/or Session ID information at several site locations or instances throughout a session, and by tracking the assigned Session ID for that particular session, incidents of session tampering or session hijacking can be detected so that appropriate responses may be conducted during the online session or post-session.

In another embodiment of the invention, methods of detecting session tampering are also provided that involve analysis of collected device fingerprints during different time intervals of an online session and/or at different portions of a web site being viewed. A preferable embodiment of the invention includes the analysis and comparison of PC fingerprints corresponding to a user device containing a relevant Session ID and other identifying information associated with the device.

Another aspect of the invention provides systems and methods for implementing secure transactions including but not limited to online purchases over the Internet. These solutions allow network or Internet users to more securely perform online transactions with other parties such as banking and financial institutions, vendors of merchandise and/or services or other transactions made over the Internet or a computer network. The occurrence of incidents involving electronic interception or session tampering or hijacking can be detected to alert companies who can thereby initiate responsive actions to prevent fraud, identify or credit card theft and financial loss.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The illustrations included within this specification describe many of the advantages and features of the invention. It shall be understood that similar reference numerals and characters noted within the illustrations herein may designate the same or like features of the invention. The illustrations and features depicted herein are not necessarily drawn to scale.

FIG. 3 is a table of fingerprint information corresponding to multiple sessions each identified by Session IDs.

DETAILED DESCRIPTION OF THE INVENTION

Figure 1:
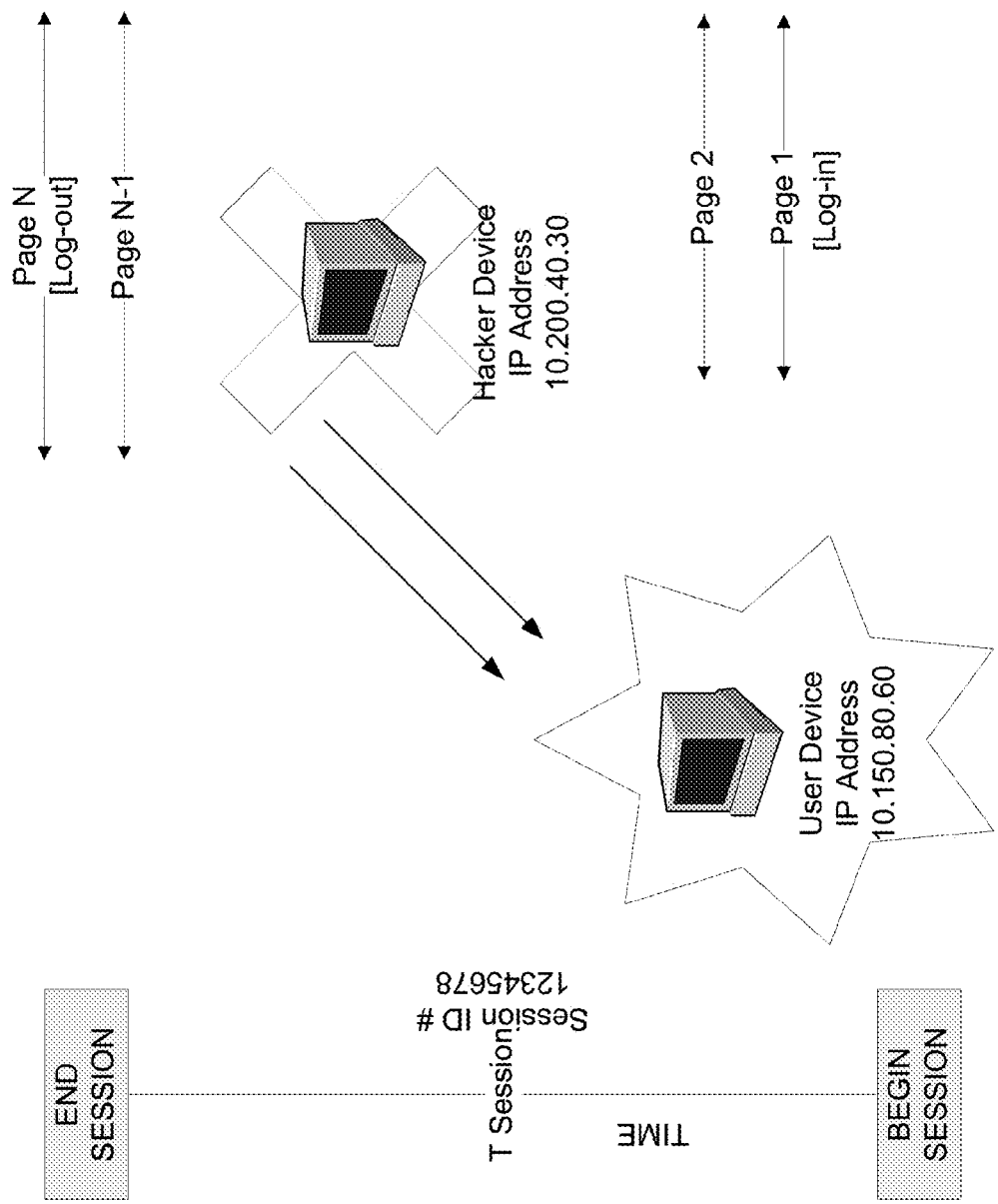
FIG. 1 illustrates an embodiment of the invention that detects session tampering by comparing a series of computer fingerprints captured throughout an online session with a selected Session ID.

The invention provides methods and apparatus for detecting session tampering and hijacking that can be applied to fraud prevention. Various aspects of the invention described herein may be applied to any of the particular applications set forth below. The invention may be applied as a standalone tool or as part of an integrated software solution against online fraud, identify theft and Internet security. The invention can be optionally integrated into existing business processes seamlessly and transparent to a user or an attacker (hacker). It shall be understood that different aspects of the invention can be appreciated individually, collectively or in combination with each other FIG. 1 is an illustration that describes a preferable embodiment of the invention that can detect session tampering or session hijacking. At the beginning of an online session, a unique Session ID (#12345678) can be generated or assigned by a financial institution or other company conducting a transaction with a client or user. A Session Identifier (Session ID) may be described as a value or number generated by a server that identifies a particular session with a user. From the beginning to the end of the session, the same Session ID is relied upon to correctly direct the flow of information (data packets) between host computers, or a client and a server. A Session ID may also be described as a unique number that a Web site server assigns a specific user for the duration of a user visit or session. The Session ID can be stored as a cookie, form field, or URL (Uniform Resource Locator).

Some Web servers generate Session IDs by simply incrementing static numbers. However, most servers use a variety of algorithms that involve more complex methods, such as factoring in the date and time of the visit, an IP address and other variables. In general, every time an Internet user visits a specific Web site, a new Session ID is assigned. Closing a Web browser and then reopening and visiting the site again using the same browser may generate a new Session ID. However, the same Session ID is sometimes maintained as long as the browser is open, even if the user leaves the site in question and returns. In some cases, Web servers terminate a session after a few minutes of inactivity and at a later time assign a new Session ID. If a Web browser is left active when visiting a site but nothing is entered for a predetermined time, e.g., 15 minutes, an existing Session ID can be discarded. When browsing continues later even at the same site, the user will be typically given another Session ID automatically. The use of Session IDs alone in their conventional form does not offer secure Web browsing.

Session IDs can be stolen using a variety of techniques: sniffing network traffic, using trojans on client PCs, using the HTTP referrer header where the identifier is stored in the query string parameters, and/or using script injectors such as cross-site scripting attacks where a malicious script is executed that redirects information intended for a legitimate user to the hacker instead. In addition, a Web browser may unknowingly send a URL containing a Session ID to an attacker. Hackers can also acquire Session IDs in other various ways including session prediction, stealing or brute force. Afterwards they can modify the exchange of information or do something else during an already existing session in what can be referred to as session tampering, or they can masquerade or pose as authorized users in forms of attacks that may be referred to as session hijacking. An increasingly more common kind of attack today is known as a man-in-the middle (MITM) attack. The attacker can observe the communication (e.g., by sniffing packets) between devices and collect and exploit the data that is transmitted.

Various aspects of the invention can be applied to guard against session tampering or hijacking during an exchange between different kinds of computers or user devices. Based on a comparison of a Session ID relative to a plurality of device fingerprints taken during a session, an authorized user may be distinguished from an attacker. When information is exchanged with an unauthorized device used by the attacker during an existing online session, it may be detectable in accordance with the concepts of the invention. It should be understood that reference to a client, device or personal computer (PC) herein includes any telecommunications device equipped with a browser which allows a user to access and interface with remote servers, particularly servers at Web sites on the Internet. These devices include but are not limited to cellular telephones, wireless handsets and telephones, personal digital assistants, palmtop/laptop or notebook computers and desktop PCs. It should also be recognized that the illustrated Web site server may include or be connected to a plurality of servers for a provider.

As shown in FIG. 1, a user client may be assigned an IP address (10.150.80.60) that may serve as a computer fingerprint by itself or it can be combined with other user or computer based parameters. This fingerprint can be uniquely distinguished from that of another device used by a hacker which is assigned a different IP address (10.200.40.30). An IP address may be generally described as an identifier for a computer or device on a TCP/IP network. Networks using the TCP/IP protocol are able to route messages based on the IP address of a destination. The format of an IP address is a 32-bit numeric address written as four numbers separated by periods. Each number can be zero to 255. For example, 1.150.30.220 could be an IP address. Within an isolated or private network, it may be possible to assign IP addresses at random as long as they are unique. However, connecting a private network to the Internet requires using registered IP addresses (called Internet addresses) to avoid duplicates. The concepts of this invention may be combined with other systems and methods that utilize computer or PC fingerprints (PCPrints) such as those described in US 2006/0010072 (Ser. No. 10/791,439), which is incorporated by reference herein in its entirety. Another preferable embodiment of the invention may utilize a device fingerprint that is composed of one or more relatively unique characteristics attributed to the physical device itself. For example, a computer fingerprint may relate to a time based characteristic of the internal clock with regard to another reference clock (time differential) or by itself (clock skew). These and other temporal characteristics of a device based on computer clocks can provide computer fingerprints in accordance with then invention by themselves or they can be combined with other distinguishing characteristics of a computing device.

During online sessions where the security of transmission between a client/server is compromised, an attacker hijacks or tampers with an already established session from another PC or device that would exhibit a different fingerprint. The established session between a user client and a Web server usually has an associated Session ID already assigned. The Session ID would include a piece of generated data to be used in network communications often over HTTP to identify a session or a series of related message exchanges. Session IDs often become necessary in cases where the communications infrastructure between computers uses a stateless protocol such as HTTP. For example, concepts of the invention can be applied to provide an e-commerce solution to detection intrusion by a hacker or thief. A Buyer who visits a Seller Web site may want to purchase a number of articles during a visit and place them during the interim in a virtual shopping cart. The Buyer can then finalize shopping by going to the site checkout page to effect payment. This typically involves an ongoing communication where a plurality of Web pages is requested by the client, and they are sent back by the server in turn. In such a situation, it is often important to keep track of the current state of the shopper cart, and a Session ID is one of the pieces of information used to achieve that goal. Once the Buyer finalizes an order or completes a certain activity, the Session ID may no longer be valid or and another session would be initiated with a new Session ID in order to purchase additional items. As described elsewhere herein, a plurality of user device fingerprints may be collected and compared to respective Session IDs with respect to online ordering and purchasing in order to detect session tampering or hijacking.

In a preferable embodiment of the invention, as illustrated in FIG. 1, a Session ID can be generated when a visitor or customer user visits an online financial or banking institution Web site. When logging-on to the site from a home page (Page 1), a new session may commence and the associated Session ID may be generated and stored by various ways as described elsewhere herein such as a cookie by a Web browser application. The browser may transparently include the cookie data in all subsequent page requests to a server within the financial institution system, thus allowing it to identify the session and send back pages to the user that may include such financial or personal data as requested. Unlike user IDs (e.g., personal user names or numbers), Session IDs are typically short-lived since they expire after a preset time of inactivity which may be minutes or hours (timed-out) or may become invalid after a certain goal or activity has been met or accomplished (logout or logoff).

Some preferable embodiments of the invention can be employed to defend against session hijacking by collecting PC fingerprints and Session ID information at multiple points of time or selected time intervals during an online banking session. Session hijacking has been described as the act of taking control of a user session after successfully obtaining or generating an authentication Session ID. Often times session hijacking involves an attacker using Session IDs captured by techniques involving brute force or reverse-engineering in order to seize control of a banking session and other Web application sessions while that session is still in progress.

A Session ID is often an identification string that is usually composed of a long, random, alpha-numeric string that is transmitted between host devices such as a client and a server. Session IDs are commonly stored in cookies, URLs and hidden fields of Web pages. A URL containing a Session ID might resemble something such like the following: http://www.123somesite.com/view/7AD30725122120803. In an HTML page, a Session ID may be stored as a hidden field and resemble something like the following: <input type="hidden" name="sessionID" value="54321abcd">. Alternatively, cookies can include Session ID information and can be set to expire (or be deleted) upon the closing of a Web browser. These are termed "session cookies" or "non-persistent" cookies typically. Cookies that last beyond a user's session are termed "persistent" cookies. Persistent cookies are usually stored in memory on a computer hard drive.

There are other known shortcomings or problems associated with employing Session IDs besides how they can be readily located by hackers. Many popular Web sites use algorithms based on easily predictable variables, such as time or IP address, in order to generate the Session IDs, causing their Session IDs to be predictable. If encryption is not used (typically SSL), Session IDs are transmitted in a clear and susceptible form that is susceptible to eavesdropping and session hijacking. In session hijacking attacks, an attacker usually takes over an already existing session that is underway. This may occur entirely unnoticed by the authorized user who may still believe an online session is ongoing. As described elsewhere herein, a client and server communication usually takes place across a network using IP-based communication methods. An attacker may use a computer and hacking software or tools to gain access to a connection between a legitimate client and Web server on the Internet, for example. The attacker can then inspect and capture traffic (packets) going over the network during an online session. By beating the client in replying back to the Web server with seemingly legitimate messages, the session may thus continue but with the attacking host computer. Accordingly, the session with the legitimate client can be dropped and the attacker can practically do anything that the legitimate client could accomplish.

Accordingly, this aspect of the invention presents comparative evidence of session hijacking when the same Session ID is used by different computers or devices that exhibit different fingerprints. A one-to-many relationship as between a Session ID and multiple device fingerprints would suggest that the online session was compromised so remedial action should be taken or required to prevent fraud or minimize risk of loss. In a preferable embodiment of the invention, a one-to-many relationship as between a Session ID and multiple IP addresses could be used to signal or identify the occurrence of session hijacking. The step of authentication can be performed numerous times during an online session rather than just at log-in to confirm user identities based on their device fingerprints for a corresponding Session ID in progress. It should be understood that device fingerprints may include an IP address component alone or with a combination of other parameters or characteristics of the device.

In another embodiment of the invention, methods of detecting session tampering are also provided. Attacks involving session tampering typically involve an attacker (or a computer program that runs on behalf of an attacker) doing something that allows the revelation or modification of the characteristics to an already established session.

Methods provided herein to detect session tampering may include an initial step of placing a plurality of fingerprint collectors in preselected or strategic locations on a Web site. A fingerprint collector may be described as a computer program residing in the memory of computer or server that is designed to extract device fingerprint information from the data or information exchanged between a (Web) server in order to identify a user device characteristic including but not limited to IP address information (see FIG. 1—Bank Server). The Web site may be designed with a group of pages (HTML pages) that contain any number of hyperlinks to each other and made available online by an individual, company, educational institution, government, or organization. For example, a financial institution may place fingerprint collectors at a log-in page (Page 1) where a customer use accesses a bank account. Other pages (Page 2) may include a fingerprint collector such as a portion of a Web site designed to facilitate electronic checking transactions or activity such as pages to "Add a New Payee" or to "Change E-mail/Street address or User Profile Information" or to "Wire Funds" or to "Make a Payment."

As with other embodiments of the invention herein, another step according to this methodology may include placement of a session collector for collecting Session ID data on each page, which is provided by an established default mechanism for most Web sites to manage and identify user sessions. A session collector may be described as a computer program residing in the memory of computer or server that is designed to extract device Session ID information from the data or information exchanged between a (Web) server in order to identify a particular online session (see FIG. 1—Bank Server). While a comparison between a plurality of fingerprints for a particular Session ID may be accomplished real-time during a session, a preferable embodiment of the invention includes a subsequent step of comparing fingerprints following termination of a session (post-session) after log-out (Page N). All of the collected fingerprints from a session can be compared with a Session ID for a particular session. This comparison can detect when or if the fingerprints of a computer or device used during the session are not all identical. When the fingerprints collected at different pages and times throughout a session are not the same for a selected Session ID, this may suggest that session hijacking and/or session tampering occurred through some unauthorized intervention. It should be understood that alternative aspects of the invention include modification and creation of corresponding algorithms to perform any or all of the preceding steps.

Another aspect of the invention provides systems and methods for implementing secure transactions including but not limited to online purchases over the Internet. During preselected time intervals or pages at a Web site, a plurality of computer fingerprints may be collected throughout the session for the computer on which a consumer conducts a purchase online by using and entering credit card information. In addition, the computer fingerprints can be collected and compared to a Session ID number assigned to the session by an online merchant. When a selected fingerprint is determined to be different from the others collected during the session, the merchant will be able to suspect possible session tampering or hijacking By collecting fingerprints and Session ID information in several locations of the site in accordance with this aspect of the invention, online retailers and others who are exposed to Internet fraud can identify when a session has been tampered with or hijacked by another device (hacker computer) that is using the same Session ID.

Figure 2:
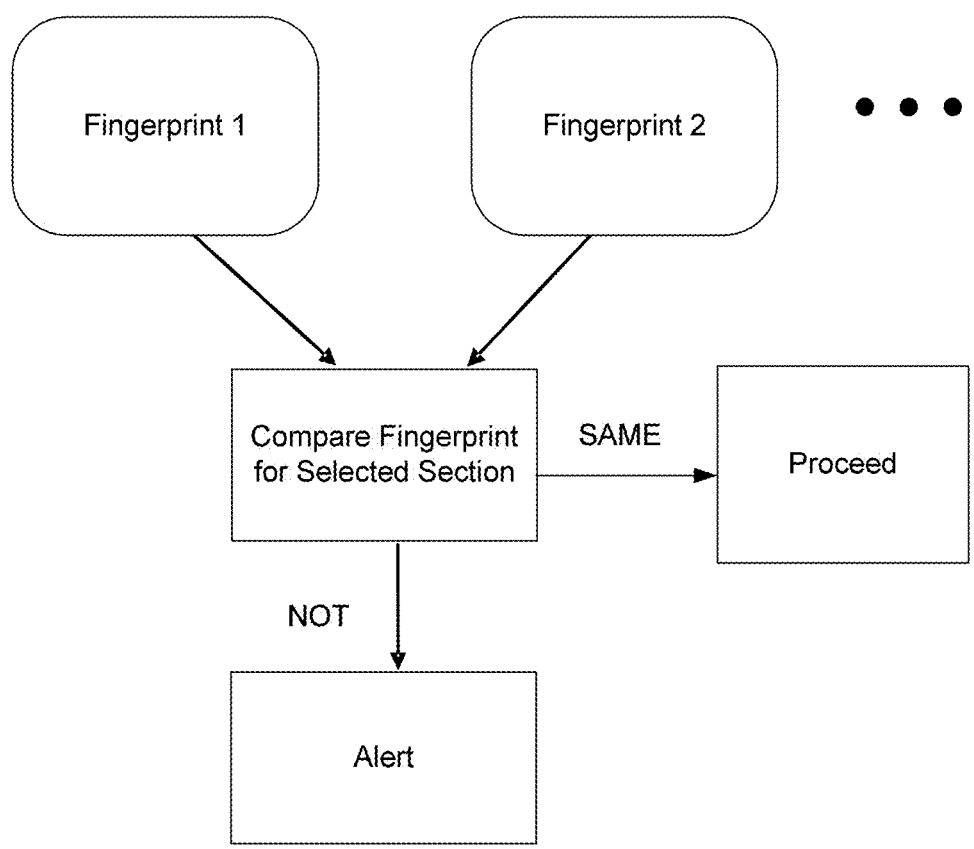
FIG. 2 describes the comparison of multiple device fingerprints taken at different times during an online session.

As shown in FIG. 2, one or more fingerprints may be compared to determine whether they match or not during an online session. For that particular online session, a persistent Session ID should be assigned and maintained for a particular user device. The user device should exhibit the same fingerprint throughout the session to suggest that no communications exchanged with a Web server came from or were redirected to another device. A first fingerprint (Fingerprint 1) can be compared against a second fingerprint (Fingerprint 2) in a preferable embodiment of the invention. One, two or more fingerprints may be collected with device fingerprint collectors as described elsewhere herein during any selected time interval of a session, or at any selected Web page that may be requested and viewed by a user through a browser. Session ID information may be also collected at substantially the same time. For example, an authentication server may be configured to extract the IP address from the information exchanged between a Web server and a user device. The IP address alone may form the device fingerprint or other parameters or user device characteristics may be included too such as a Browser ID. If the first fingerprint matches the second fingerprint with respect to the same Session ID, then the user may be allowed to proceed to another Web page or portion of a site.

Furthermore, for online banking applications, the first fingerprint may be taken while the user is logging-on from a home page. A Session ID can be then established for that session. Before allowing the user to perform online banking functions or activity including but not limited to withdrawing or transferring funds or changing passwords, the second fingerprint may be collected along with its corresponding Session ID information. Unlike conventional systems, this additional authentication step is performed again so that the comparison between fingerprints can be performed for that particular session relative to the same Session ID. When the fingerprints do not match, then the activity requested may be immediately denied and communicated to the user. For other applications of the invention, the transaction may be flagged for further review later by the financial institution. It may not be preferable often times to reveal to attackers at what point in time during a session was fraud suspected.

Another preferable embodiment of the invention provides post-session comparison of user or device fingerprints and Session IDs. This analysis allows the merchant to reject a transaction or to at least flag an incident so that further investigation can be conducted. For example, many financial institutions (e.g., Bank of America) build-in lag time or delay as to when financial activity such as electronic checking can be completed by a customer payor and mailed to a payee. An online customer may be advised of status such as the transaction is "pending" or "in progress" or "scheduled." During this time, in addition to other desired procedural checks implemented by the financial institution, a series of customer transactions reports can be analyzed for possible fraud.

FIG. 3 illustrates another embodiment of the invention that provides backend solutions to detect and prevent fraud. A server may resided within the network of a financial institution and have a database memory for storing customer transactions with corresponding session information. The session information may include a plurality of Session IDs (SID1, SID2 etc.) for one or more customers requesting numerous transactions. Each transaction may have a Session ID and a plurality of user fingerprints (FP1, FP2 etc.) obtained or collected at different times during the session or at different locations/pages of the bank Web site. As with other embodiments of the invention, it shall be understood that the number of user fingerprints collected may be varied. For certain kinds of transactions, accounts or instances where the levels of suspected fraud are unusually high, it may be preferable to collect relatively more fingerprints throughout an online session. The session information may include the times (t1, t2, etc.) as to when fingerprints are collected and/or the locations (Web pages) where fingerprints are obtained (P1, P2 etc.). For preferable embodiments of the invention, a person (fraud case analyst) can manually inspect and review the session information and customer transaction reports, or a computer program can be selected to compare user fingerprints collected corresponding to a particular Session ID in order to assess the likelihood of fraud. Accordingly, these fraud detection solutions can be relatively invisible to an attacker (hacker) and provide more secure user transactions with parties such as banking and financial institutions, vendors of merchandise and/or services or other transactions made over the Internet or a computer network. The occurrence of incidents involving electronic interception or session tampering or hijacking can be detected to alert companies who can thereby initiate responsive actions to prevent fraud and financial loss.

The invention herein provides methods and systems for fraud prevention and security relating to online sessions with users on a network or the Internet. It shall be understood that principles of the invention can be applied and modified for application with other fraud prevention and session monitoring systems and methods such as those described in published U.S. patent applications US 2002/0073046 (Ser. No. 09/875, 795) and US 2004/0254890 (Ser. No. 10/444,506), which are each incorporated by reference herein in their entirety. Any of the aforementioned embodiments of the invention can be also integrated into existing business processes and state-of-the art security systems. For example, the invention may be applied to authentication systems that incorporate static (persistent) passwords that remain the same in between sessions and log-ins. Or, alternatively, various aspects of the invention can be applied to systems that provide a one-time password (OTP) that changes for each online session. The use of an OTP makes it more difficult usually to gain unauthorized access to restricted resources or online sessions. An OTP may be essentially a series of numbers or other characters generated by a mathematical algorithm (soft token) and/or displayed on a physical device (hard token) that is synchronized with an authentication server. Even with relatively secure sessions protected by OTP authentication, session tampering and/or hijacking is possible. Accordingly, multiple computer or device fingerprints can be collected as described above during multiple points or places during an online session authenticated with an OTP token so that a comparison can be made relative to particular Session ID.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for detecting an online transaction tampering, the method comprising:
    establishing a Session ID for activity between a computer and a user device over a network, wherein the Session ID is associated with at least two device fingerprints collected while an article is in a virtual shopping cart;
    instructing the computer to collect the at least two device fingerprints, while the article is in the virtual shopping cart, from the user device for the corresponding Session ID, wherein the at least two device fingerprints are collected from at least two different pre-selected pages displaying different content that are configured for an online transaction tampering comparison; and
    comparing the at least two device fingerprints, and if the at least two device fingerprints collected from the at least two different pre-selected pages are not identical, detecting the online transaction tampering and providing an alert.

2. The method as recited in claim 1 wherein each of the at least two device fingerprints include IP address information for the user device.

3. The method as recited in claim 1 wherein each of the at least two device fingerprints include a time differential between an internal clock of the user device and another reference clock.

4. The method as recited in claim 1 further comprising the step of collecting Session ID information corresponding to the two device fingerprints at the same times as collecting the two device fingerprints.

5. The method as recited in claim 1 wherein the network is the Internet.

6. The method as recited in claim 1 wherein the computer is a server for an online merchant.

7. The method as recited in claim 1 wherein the user device is a desktop computer, laptop computer, personal digital assistant or phone.

8. The method as recited in claim 1 wherein the two different pre-selected pages are HTML pages.

9. The method as recited in claim 1 wherein the two device fingerprints are compared after an order of the article in the virtual shopping cart is finalized.

10. The method as recited in claim 9 wherein the order of the article in the virtual shopping cart is finalized after the user goes to a site checkout page to effect payment.

11. The method as recited in claim 1 wherein at least one of the two device fingerprints is collected when an order of the article in the virtual shopping cart is finalized.

12. A non-transitory computer system loaded with machine readable instructions for carrying out a method of detecting an online transaction tampering, the method comprising:
    establishing a Session ID for activity between a computer and a user device over a network, wherein the Session ID is associated with at least two device fingerprints collected while an article is in a virtual shopping cart;
    instructing the computer to collect the at least two device fingerprints, while the article is in the virtual shopping cart, from the user device for the corresponding Session ID, wherein the at least two device fingerprints are collected from at least two different pre-selected pages displaying different content that are configured for an online transaction tampering comparison; and comparing the at least two device fingerprints, and if the at least two device fingerprints collected from the at least two different pre-selected pages are not identical, detecting the online transaction tampering and providing an alert.

13. A network security system for an online merchant that detects when an online transaction is compromised comprising:
- a server within an online merchant network for conducting an online transaction with a customer device, wherein the Session ID is associated with device fingerprints collected while an article is in a virtual shopping cart;
- a fingerprint collector within the online merchant network for collecting the device fingerprints at predetermined intervals during the online transaction from the customer device, wherein the device fingerprints are collected while the article is in the virtual shopping cart, from at least two different pre-selected pages displaying different content that are configured for an online transaction tampering comparison;
- a session collector within the online merchant network for collecting Session ID information at the predetermined intervals from the customer device; and
- a memory for storing information collected from the fingerprint collector including the pages where the device fingerprints are obtained in order to enable a comparison between the device fingerprints collected from the at least two different pre-selected pages and the Session ID information that suggests that the online transaction is compromised if the device fingerprints are not identical.

14. The network security system as recited in claim 13, wherein the online transaction occurs after authentication with a one-time password (OTP).

15. The network security system as recited in claim 13, wherein each of the device fingerprints include IP address information for the user device.

16. The network security system as recited in claim 13, wherein each of the device fingerprints include a time differential between an internal clock of the user device and another reference clock.

17. The network security system as recited in claim 13, wherein the customer device is a desktop computer, laptop computer, personal digital assistant or phone.

18. The network security system as recited in claim 13, wherein the two different pre-selected pages are HTML pages.

19. The network security system as recited in claim 13, wherein the device fingerprints are compared after an order of the article in the virtual shopping cart is finalized.

20. The network security system as recited in claim 13, wherein at least one of the at least two different pre-selected pages includes a page that concludes the online transaction.

* * * * *